United States Patent
Chbaly et al.

(10) Patent No.: US 11,129,049 B2
(45) Date of Patent: Sep. 21, 2021

(54) METHODS AND APPARATUS FOR RADIO TRANSMITTERS MANAGEMENT AND RESOURCE OPTIMIZATION IN MULTI-BAND WIRELESS NETWORKS

(71) Applicant: SYSTEMS AND SOFTWARE ENTERPRISES, LLC, Brea, CA (US)

(72) Inventors: Khaoula Chbaly, Munich (DE); Leonardo Goratti, Tutzing (DE); Tinku Rasheed, Gilching (DE)

(73) Assignee: Systems and Software Enterprises, LLC, Brea, CA (US)

( * ) Notice: Subject to any disclaimer, the term of this patent is extended or adjusted under 35 U.S.C. 154(b) by 73 days.

(21) Appl. No.: 16/704,980

(22) Filed: Dec. 5, 2019

(65) Prior Publication Data
US 2020/0187053 A1 Jun. 11, 2020

Related U.S. Application Data

(60) Provisional application No. 62/775,519, filed on Dec. 5, 2018.

(51) Int. Cl.
H04W 28/04 (2009.01)
H04W 28/08 (2009.01)
H04W 28/06 (2009.01)
H04W 28/18 (2009.01)

(52) U.S. Cl.
CPC ........... H04W 28/08 (2013.01); H04W 28/06 (2013.01); H04W 28/18 (2013.01)

(58) Field of Classification Search
CPC ..... H04W 24/02; H04W 28/16; H04W 28/06; H04W 28/18; H04W 28/08
See application file for complete search history.

(56) References Cited

U.S. PATENT DOCUMENTS

| | | | |
|---|---|---|---|
| 8,320,949 B2 | 11/2012 | Matta | |
| 9,507,813 B1 | 11/2016 | Ma et al. | |
| 9,977,805 B1* | 5/2018 | Bowman | ............. G06F 16/9014 |
| 10,341,877 B2 | 7/2019 | Ganu et al. | |
| 2003/0023711 A1* | 1/2003 | Parmar | ............... H04L 41/0893 |
| | | | 709/223 |

(Continued)

FOREIGN PATENT DOCUMENTS

EP 3509385 A1 7/2019

OTHER PUBLICATIONS

Korean Intellectual Property Office, International Search Report and Written Opinion, dated Mar. 31, 2020.

(Continued)

*Primary Examiner* — Syed Ali
(74) *Attorney, Agent, or Firm* — Umberg Zipser LLP; Ryan Dean

(57) ABSTRACT

Systems and methods are described for managing wireless access points in a multi-band wireless network. The systems and methods can involve one or more wireless distribution units that are each associated with a set of wireless access points and a data collector that collects information about an environment where that wireless distribution unit is located. Based on the information collected, a control unit that is communicatively coupled with the one or more wireless distribution units can utilize a central cognitive engine to balance a load across the one or more wireless distribution units.

9 Claims, 6 Drawing Sheets

(56) References Cited

U.S. PATENT DOCUMENTS

| | | | |
|---|---|---|---|
| 2005/0027840 A1 | 2/2005 | Theobold et al. | |
| 2006/0242285 A1* | 10/2006 | Moriwaki | H04L 67/12 |
| | | | 709/223 |
| 2008/0120315 A1* | 5/2008 | Ionescu | H03M 7/30 |
| 2011/0319020 A1* | 12/2011 | Desai | H04W 4/80 |
| | | | 455/41.2 |
| 2013/0218455 A1* | 8/2013 | Clark | G06Q 50/30 |
| | | | 701/411 |
| 2015/0350974 A1 | 12/2015 | Patil et al. | |
| 2017/0026293 A1 | 1/2017 | Desclos et al. | |
| 2018/0279192 A1 | 9/2018 | Raissinia et al. | |
| 2018/0352581 A1* | 12/2018 | Segal | H04W 74/0841 |
| 2019/0007842 A1 | 1/2019 | Ganu et al. | |
| 2019/0197255 A1* | 6/2019 | Lehnhardt | G06F 16/2272 |

OTHER PUBLICATIONS

Won-Suk Kim et al., 'Proxy SDN Controller for Wireless Networks', Hindawi Publishing Corporation Mobile Information Systems vol. 2016, Article ID 7172187, Aug. 4, 2016.

* cited by examiner

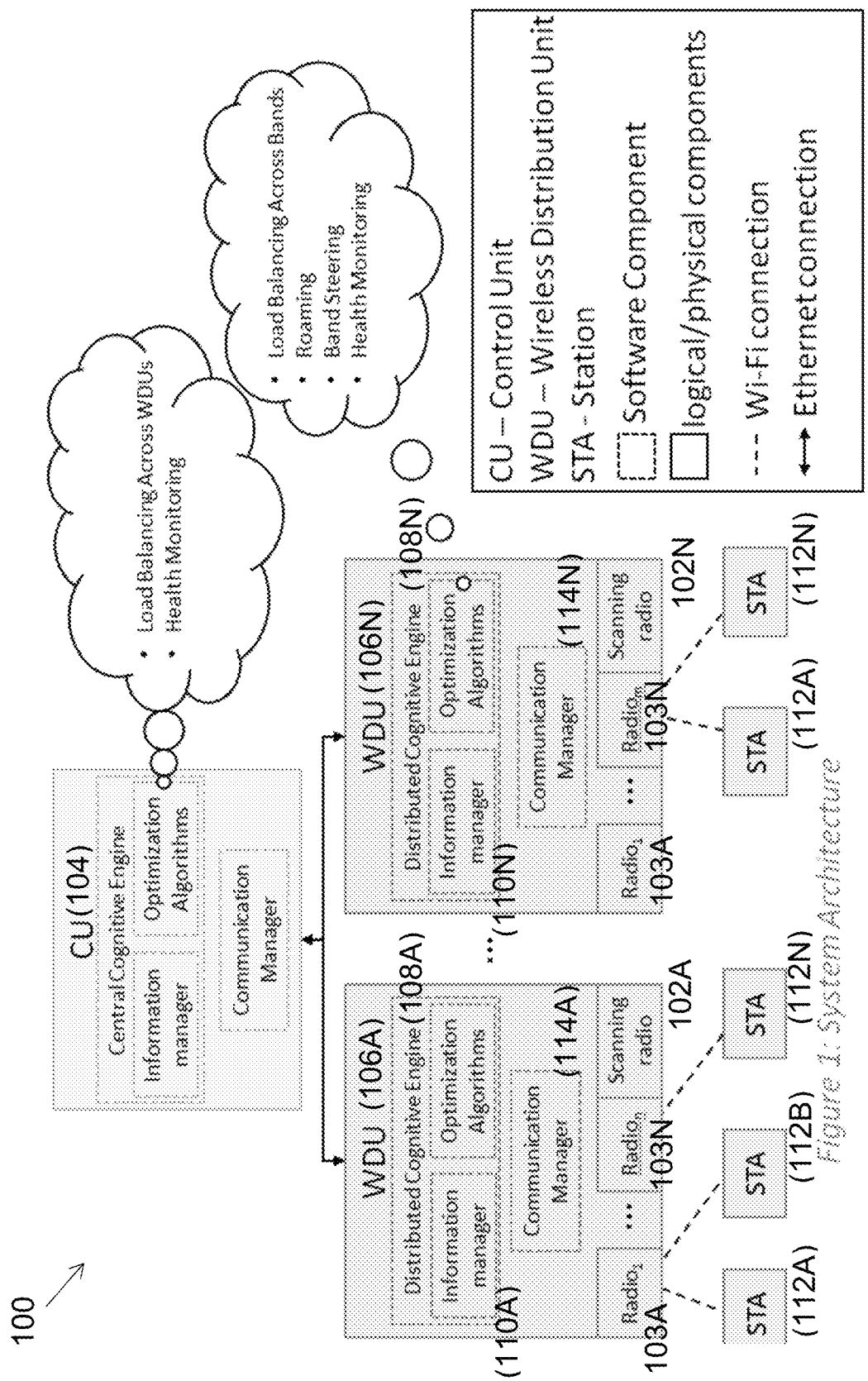
Figure 1: System Architecture

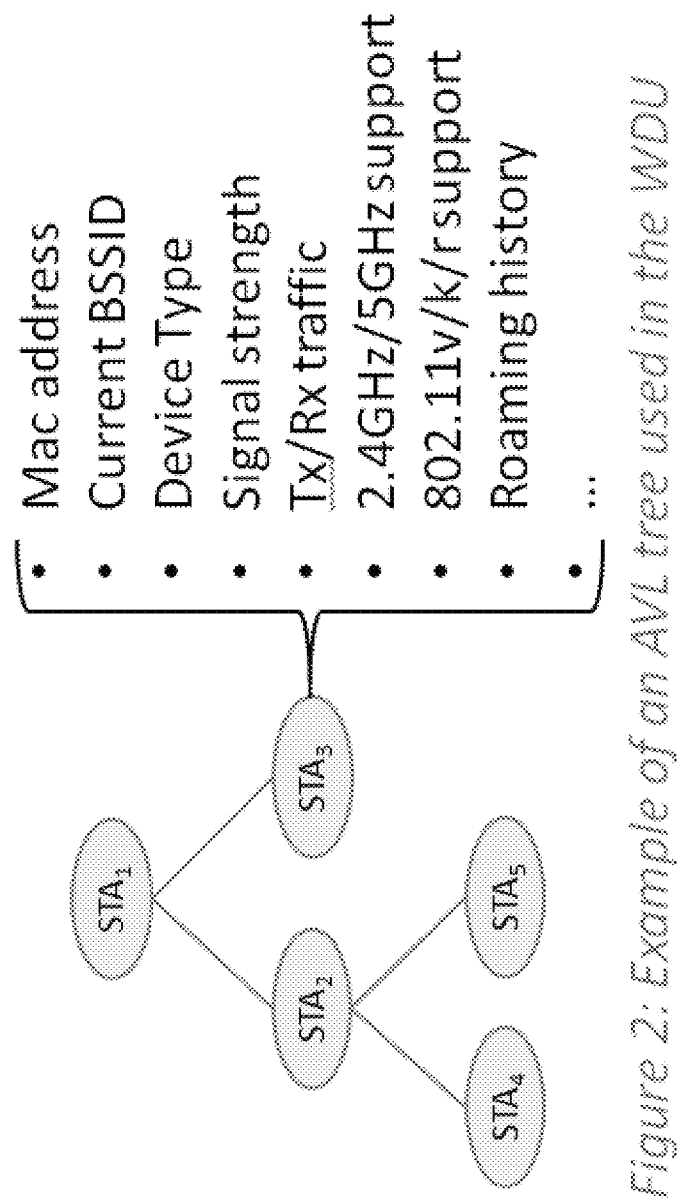
Figure 2: Example of an AVL tree used in the WDU

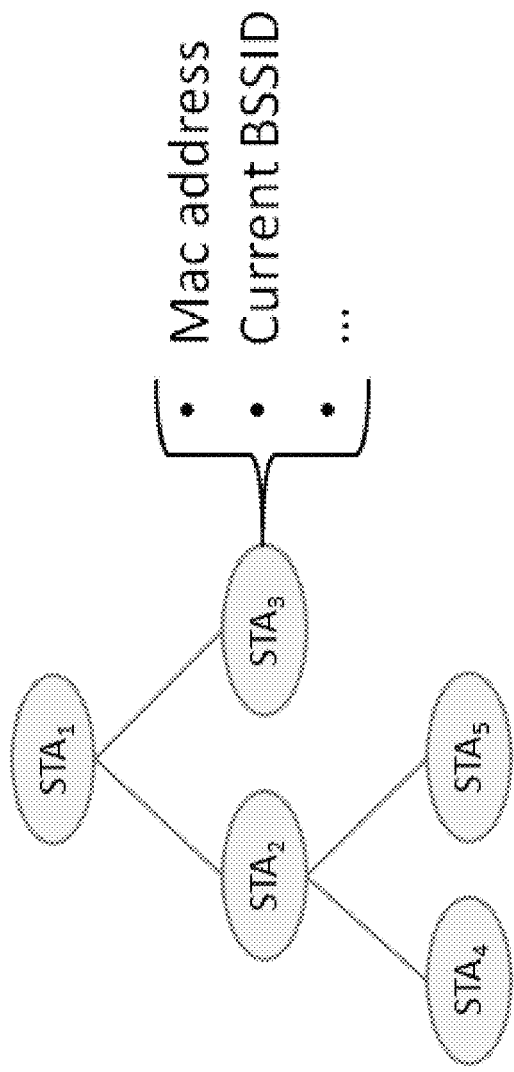
Figure 3: Example of an AVL tree used in the CU

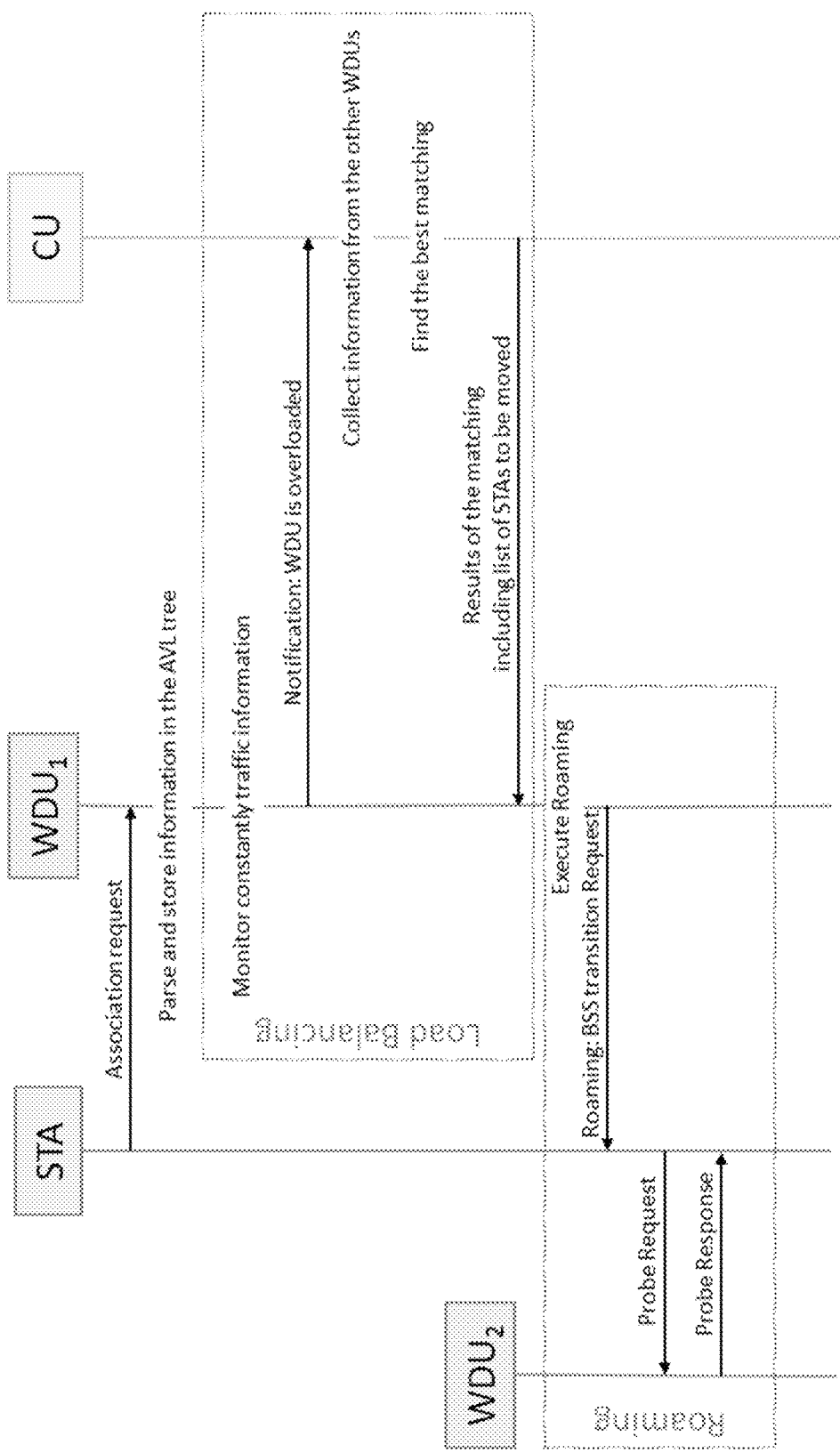
Figure 4: Load balancing and roaming example

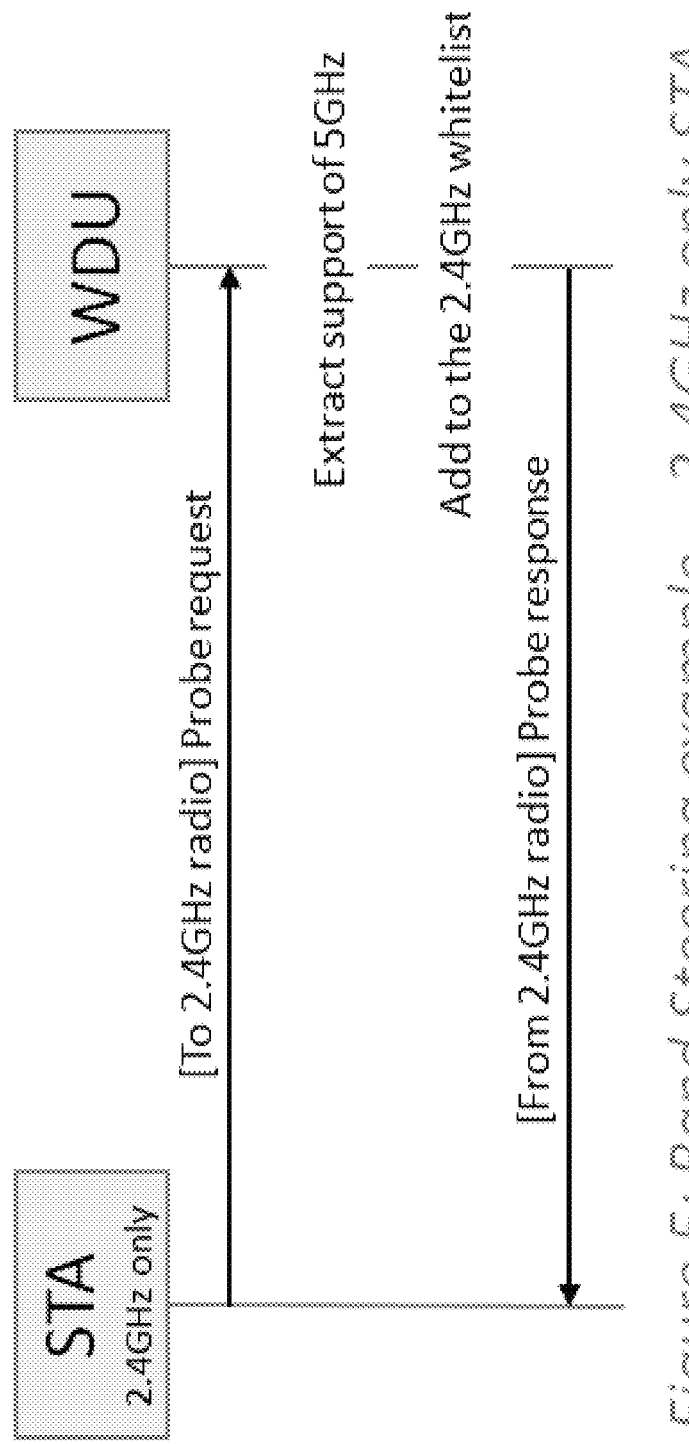
Figure 5: Band Steering example – 2.4GHz only STA

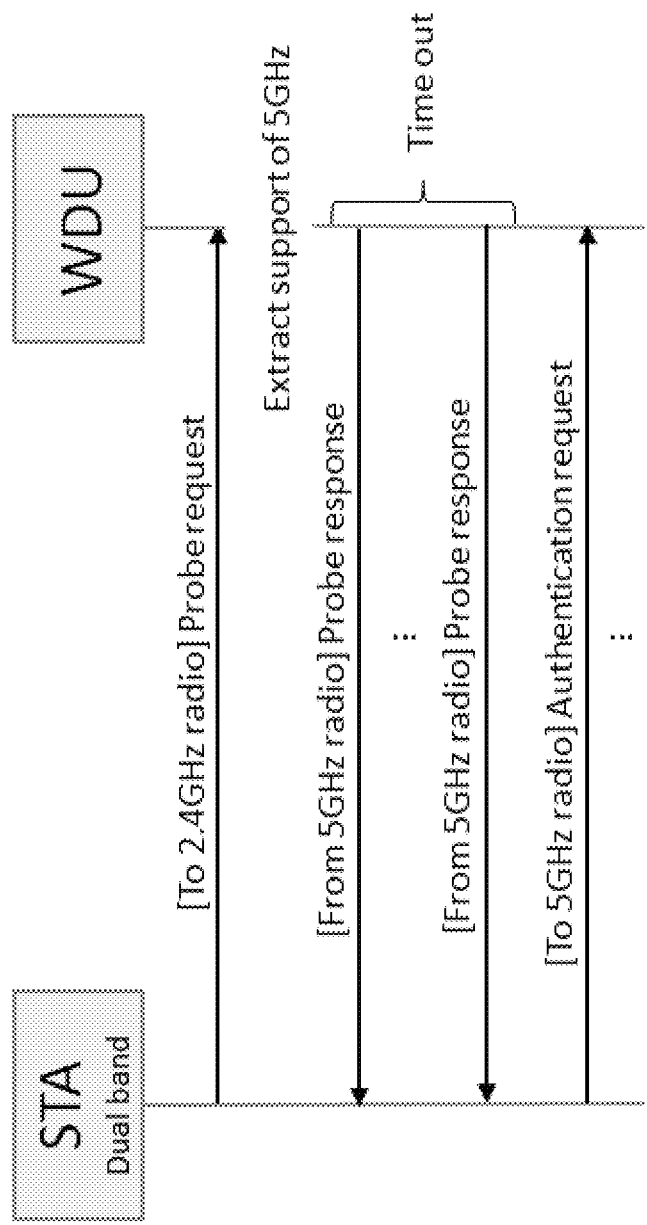
Figure 6: Band Steering example – Dual band STA

METHODS AND APPARATUS FOR RADIO TRANSMITTERS MANAGEMENT AND RESOURCE OPTIMIZATION IN MULTI-BAND WIRELESS NETWORKS

This application claims priority to U.S. provisional application having Ser. No. 62/775,519 filed on Dec. 5, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is wireless access point management.

BACKGROUND

The following description includes information that may be useful in understanding the present invention. It is not an admission that any of the information provided herein is prior art or relevant to the presently claimed invention, or that any publication specifically or implicitly referenced is prior art.

Currently, wireless networks within aircraft or other vehicles includes multiple wireless access points (WAPs) covering multiple bands (e.g., 2.4 GHz and 5 GHz). As used herein, WAPs can include any device that permits other devices to connect wirelessly to a network using WiFi or related standards. This can be problematic as the multiple WAPs create congestion, where the overload of one or more of the radios is more likely to occur due to the wireless radio environment congestion.

In addition, such environment can result in wireless clients usually being incapable of exploiting other surrounding WAPs. Further, it is possible that a subset of client devices could capture a majority of the resources. Finally, multiple WAPs can lead to uncontrolled proliferation of interference cases, which can result in performance degradation in the wireless spectrum.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for management and optimization of WAPs in a multi-band wireless network.

SUMMARY OF THE INVENTION

The inventive subject matter provides apparatus, systems and methods for management and optimization of WAPs in a multi-band wireless network, such as via collecting capabilities of the client devices and exchanging information between multiple WAPs. A communication network (e.g., IP based, Ethernet based, etc.) is implicitly assumed to be in place between WAPs.

Exemplary systems and methods for managing wireless access points in a multi-band wireless network are described below.

In one embodiment, a system comprises a first wireless distribution unit (WDU) associated with a first set of wireless access points. A first data collector can be configured to collect a first set of information about an environment where the first WDU is located. The system can further comprise a second WDU associated with a second set of wireless access points with a second data collector configured to collect a second set of information about an environment where the second WDU is located.

A control unit can be communicatively coupled with each of the first and second WDUs, and comprise a central cognitive engine configured to balance a load across the first and second WDUs based on the first and second sets of information received from the first and second WDUs.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a diagram of one embodiment of a system architecture for management of a plurality of wireless access points in multi-band wireless networks.

FIG. 2 is a diagram of one embodiment of an AVL tree as an example case.

FIG. 3 is a diagram of another embodiment of an AVL tree as an example case.

FIG. 4 is a workflow of one embodiment of load balancing in a system for management of a plurality of wireless access points in multi-band wireless networks.

FIG. 5 is a workflow of one embodiment of band steering in a system for management of a plurality of wireless access points in multi-band wireless networks.

FIG. 6 is a workflow of another embodiment of band steering in a system for management of a plurality of wireless access points in multi-band wireless networks.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIG. 1 illustrates an exemplary system architecture 100, in which a scanning radio 102A-102N is used to collect information about an environment or used as a back-up if one of the other radios 103A-103N fails, for example. The system comprises a control unit (CU) 104 and one or more wireless distribution units (WDUs) 106A-106N, each of which comprises a cognitive engine 108A-108N.

The cognitive engines 108A-108N each comprises an information manager 110A-110N, which is configured to collect information through different components or data collectors, including, for example, client devices, scanning radios 102A, 102B, stations (STAs) 112A-112N and WDUs 106A-106N. This information can then be used by the optimization algorithms stored in the control unit 104 and WDUs 106A-106N. In this manner, information from clients of the WAPs could be used as well to provide a more in-depth level of granularity than might be obtained via a scanning radio 102A-102N.

The control unit 104 can comprise any device capable of communicating with a communications network. Such network can include communications network including, for example, a local intranet within an aircraft or the Internet.

Contemplated wireless access points (WAPs) (i.e. stations 112A-112N) comprise physical devices having one or more radio transmitters configured to communicate with other devices. The wireless access points comprise stations that transfer and receive data via the radio transmitters. In some embodiments, a wireless access point can have two or more radios, each of which is configured for transmission over a different band.

Each WDU 106A-106N is configured to run a first set of optimization algorithms, which do not require any communication between the WDUs 106A-106N. This can include, for example, band steering.

The control unit 104 is configured to run a second set of optimization algorithms, which require collecting information from at least two WDUs 106A-106N, processing the information, and making a central decision. This can include, for example, load balancing.

The system can include one or more WDUs 106A-106N, running on the WAP. Each WDU 106A-106N can comprise an information manager 110A-110N, which is configured to store information about associated stations (STAs) 112A-112N in a suitable data structure. An example data structure, the AVL tree, is shown in FIG. 2.

Each WDU 106A-106N can further comprise a communication manager 114A-114N, which is configured to manage the communication between the WDU 106A-106N and the control unit 104.

The control unit 104 of the system comprises the controller of the system. The control unit 104 can be a separate device or a logical component disposed in a WAP. It is contemplated that if the control unit is running as a logical component, the control unit can be rotated across the WAPs, for example. The control unit can also include an information manager, which is configured to store relevant information, among which can include information about the associated STAs in an AVL, an example of which is shown in FIG. 3. In order to avoid duplicating information of the STAs that is already saved in the WDU, the control unit can be configured to store only the relevant information.

The control unit 104 can further include a communication manager 116, which is configured to manage communication between the control unit 104 and the WDUs 106A-106N.

FIG. 4 illustrates an example of load balancing and roaming that can be performed by the control unit 104 and the WDUs 106A-106N. To find the best matching, the control unit 104 analyzes several pieces of information including, for example, signal strength received from the STA, clients capacities (i.e., support of 802.11v), and roaming history of the clients. One technique that might be used during the roaming phase is the BSS transition (i.e., 802.11v).

In the example of band steering in FIG. 4 for a 2.4 GHz only station (STA), while FIG. 5 illustrates an example of band steering for a 5 GHz station (STA). In these examples, 2.4 GHz is considered the non-preferred band and 5 GHz is considered the preferred band.

Each WDU 106A-106N is configured to add a STA to its whitelist of the non-preferred band if (i) the STA supports only the non-preferred band; or (ii) if the STA supports both the non-preferred and preferred bands, but always tries to connect to the non-preferred band (see FIG. 5). In such embodiment, the only STAs that should be allowed to connect to the non-preferred bands are the ones listed in the whitelist of the WDU 106A-106N.

FIG. 5 illustrates another example of band steering with dual-band STAs. In this example, if after a time out, the STA still tries to connect to 2.4 GHz radio, it should be added to the 2.4 GHz whitelist and accepted. This will ensure that no STA is disconnected forever.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for management of wireless access points in a multi-band wireless network, comprising:
   a first wireless distribution unit (WDU) associated with a first set of wireless access points, and comprising a first data collector configured to collect a first set of information about an environment where the first WDU is located;
   a second WDU associated with a second set of wireless access points, and comprising a second data collector configured to collect a second set of information about an environment where the second WDU is located; and
   a control unit communicatively coupled with each of the first and second WDUs, and comprising a central cognitive engine configured to balance a load across the first and second WDUs based on the first and second sets of information received from the first and second WDUs, respectively;
   wherein the central cognitive engine further comprises an information manager configured to receive the first and second sets of information, wherein the information manager is configured to store received information in an AVL tree, wherein the information manager is configured to compare the received information with information stored in the first and second WDUs, remove non-relevant or duplicative information, and store the remaining information in the AVL tree; and
   wherein the central cognitive engine comprises a set of optimization algorithms, and wherein the central cognitive engine is configured to use the optimization algorithms to balance the load across the first and second WDUs based on the first and second sets of information.

2. The system of claim 1, wherein the first and second data collectors comprise first and second scanning radios, respectively.

3. The system of claim 2, wherein the first and second scanning radios are each configured for use as a backup wireless access point.

4. The system of claim 1, wherein the first and second data collectors comprise first and second client devices, respectively, that wireless connect to one of the access points of the first or second set.

5. The system of claim 1, wherein each of the first and second WDUs comprises a distributed cognitive engine having an information manager.

6. The system of claim 5, wherein each of the distributed cognitive engines of the first and second WDUs are configured to steer client devices between wireless bands using first and second sets of optimization algorithms stored in the respective distributed cognitive engine and the information collected by at least one of the first and second data collectors.

7. The system of claim 5, wherein each information manager is configured to store information about the associated first or second sets of wireless access points in an AVL tree.

8. The system of claim 1, wherein each of the control unit and first and second WDUs comprises a communication manager, each of which is configured to manage communication between at least two of (i) the first WDU, (ii) the second WDU, and (iii) the control unit.

9. The system of claim 1, wherein the central cognitive engine is further configured to balance the load by analyzing at least one of a signal strength received from an associated wireless access point, a client device capacity, and a roaming history of a client device.

* * * * *